United States Patent
Peters, Jr.

(10) Patent No.: US 7,382,533 B1
(45) Date of Patent: Jun. 3, 2008

(54) DISC BASED ALT-AZIMUTH TELESCOPE MOUNT

(76) Inventor: Lyal T. Peters, Jr., 1570 SW. 139 Ave., Davie, FL (US) 33325

( * ) Notice: Subject to any disclaimer, the term of this patent is extended or adjusted under 35 U.S.C. 154(b) by 0 days.

(21) Appl. No.: 11/440,306

(22) Filed: May 24, 2006

(51) Int. Cl.
G02B 23/00 (2006.01)

(52) U.S. Cl. .................................. 359/430; 359/429

(58) Field of Classification Search ............. 359/430, 359/429
See application file for complete search history.

(56) References Cited

U.S. PATENT DOCUMENTS 6,445,498 B1 * 9/2002 Baun et al. ................. 359/430
6,671,091 B2 * 12/2003 McWilliams ................ 359/430
2004/0085632 A1 * 5/2004 Shen ........................... 359/430

* cited by examiner

Primary Examiner—Joshua L Pritchett
(74) Attorney, Agent, or Firm—Gold & Rizvi, P.A.; H. John Rizvi; Glenn E. Gold

(57) ABSTRACT

A disc-based altitude-azimuth telescope mount for mounting and adjusting a telescope along altitude and azimuth axes. The telescope mount includes an azimuth disc assembly for facilitating adjustment of the telescope along the azimuth axis and an altitude disc assembly for facilitating adjustment of the telescope along the altitude axis. A friction adjusting mechanism operably engages the azimuth disc assembly and the altitude disc assembly to prevent inadvertent movement of the telescope along both axes. A digital setting circle may be operably connected to the disc assemblies to facilitate automatic adjustment of the telescope, as desired.

16 Claims, 5 Drawing Sheets

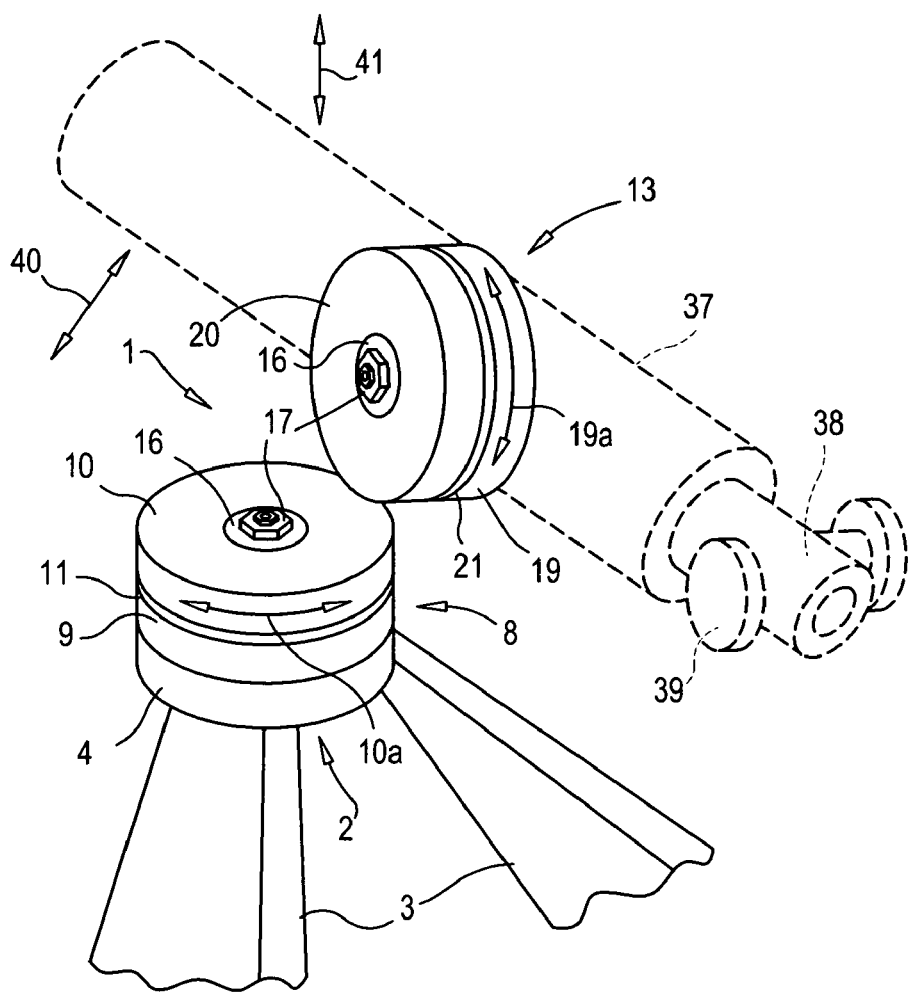
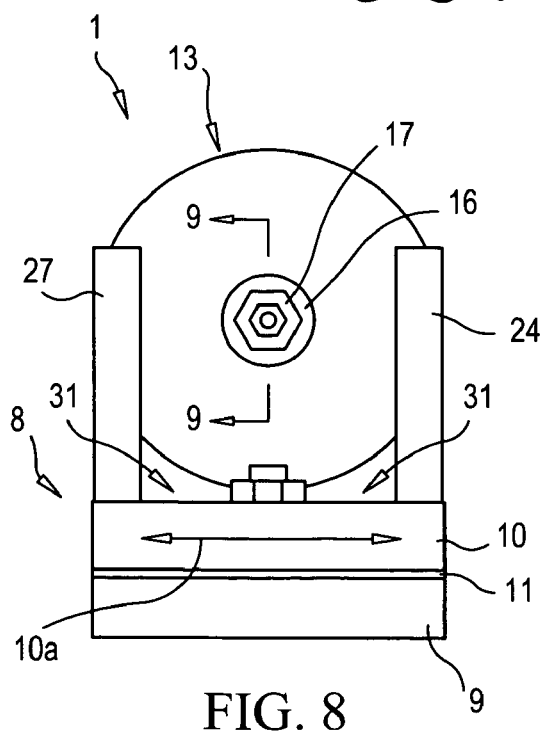
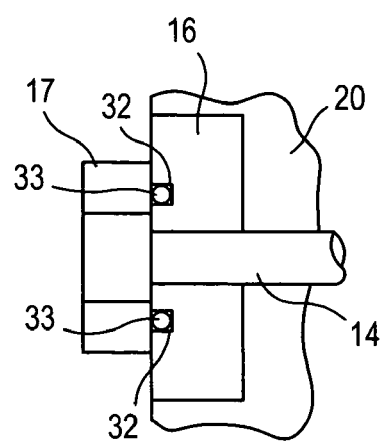
FIG. 7
FIG. 8
FIG. 9

DISC BASED ALT-AZIMUTH TELESCOPE MOUNT

CROSS-REFERENCE TO RELATED APPLICATIONS

This application claims the benefit of U.S. Provisional Patent Application No. 60/445,991, filed Feb. 6, 2003, and U.S. Non-Provisional patent application Ser. No. 10/772,986, filed Feb. 5, 2004, both of which are incorporated by reference herein in their entireties.

BACKGROUND OF THE INVENTION

1. Field of the Invention

The present invention relates generally to telescope mounts, and more particularly, to a disc-based alt-azimuth mount for telescopes.

2. Description of the Prior Art

A wide variety of telescope mounts are available for both astronomical and non-astronomical telescopes. These generally fall under two broad categories, namely equatorial and altitude-azimuth mounts. Equatorial mounts are designed to follow the celestial sphere by moving the telescope in one axis only. An alt-azimuth mount, on the other hand, is designed to move in two axes to follow both the celestial sphere and the vertical altitude dimension.

Because of its simplicity, the alt-azimuth mount has gained popularity in recent years as a multi-purpose astronomical and non-astronomical mount. The new professional telescopes are now being built with alt-azimuth mounts and computer driven motors moving in both axes to track celestial objects. The mount has also gained popularity with the advent of new precision-built and optically-correct wide field refractor (lens in front) telescopes being used for astronomical and terrestrial objects.

Unfortunately, existing alt-azimuth telescope mounts have proven to be quite amendable to vibrations and do not remain rigid to outside forces such as wind or touch. Such vibrations are most evident in single arm mounts and intensify as the length of the arms is increased. Although adding a second arm has reduced this problem somewhat, it has lead to a host of other design deficiencies, such as not being able to carry telescopes of varying widths. One notable drawback found in existing alt-azimuth telescope mounts is that they are not able to handle telescopes of varying sizes without the addition of counter-balance devices and do not permit the mount to swing freely without interference from the telescope hitting the base of the mount.

A further problem encountered with existing alt-azimuth telescope mounts is that they are not able to handle various size loads such as cameras, eyepieces and the like without unwanted movement caused by imbalance. Many telescopes allow the observer to interchange eyepieces, allowing an increase or decrease in magnification. Cameras may also be used in place of eyepieces in order to take pictures. Modern eyepieces weight can range from as little as two ounces for high magnification, to over two and a half pounds for a wide field low magnification. If the telescope is balanced for a heavy eyepiece and the eyepiece is removed, the telescope will rotate forward. Likewise, if the telescope is balanced for a light weight (or no eyepiece), then the telescope will drop in the rear. To overcome this problem, some mounts have locks to prevent the axis from moving. The observer moves the telescope to the object and locks the axis. However, the object seldom remains stationary (a sighted dear runs or the earth rotates, for example). In order to address this problem, designers have added slow motion mechanisms. These mechanisms, however, have generally proven cumbersome and inadequate in practice because the mount axis must be locked during use. Similarly, friction locks have not adequately addressed this issue.

Additionally, existing mounts often do not maintain all axes and planes perfectly orthogonal with each other as required for accuracy when electronic shaft encoders are utilized with computerized locaters, commonly known in the art as setting circles. Significant errors are introduced where the axes of the telescope mount are not perfectly orthogonal.

Accordingly, there is an established need for a disc based alt-azimuth telescope mount for use with any of a variety of existing telescopes that addresses and overcomes the aforementioned problems and disadvantages found in existing telescope mounting systems.

SUMMARY OF THE INVENTION

The present invention is directed to a disc based alt-azimuth telescope mount for use with any of a variety of existing telescopes.

An object of the present invention is to provide a disc based alt-azimuth telescope mount that permits the magnitude of friction to be easily adjusted between discs.

A further object of the present invention is to provide a disc based alt-azimuth telescope mount wherein ball bearings rather than the disc surface are utilized to permit a disc-tightening nut to turn with the shaft of the telescope mount.

It is also an object of the present invention to provide a disc-based alt-aximuth telescope mount that does not require constant friction adjustment.

Another object of the present invention is to provide a disc based alt-azimuth telescope mount that eliminates the need to utilize set screws, pins, and other mechanisms that permit friction adjusting nut loosening over time.

An additional object of the present invention is to provide a disc based alt-azimuth telescope mount that is configured to accept any of a wide variety of loads such as eyepieces, cameras, and the like, without rebalance.

Yet another object of the present invention is to provide a disc based alt-azimuth telescope mount wherein the axes are orthogonal such that the shafts within each axis are positioned at right angles.

A further object of the present invention is to provide a disc based alt-azimuth telescope mount configured to permit electronic shaft encoders to be mounted directly to the axis shafts.

Another object of the present invention is to provide a disc based alt-azimuth telescope mount optionally fitted with electronic shaft encoders which, when used, are located on the same plane of the corresponding azimuth or altitude axis so that battery-powered astronomical setting circles and other equipment can be utilized without cables interfering with the telescope mount operation.

An additional object of the present invention is to provide a disc based alt-azimuth telescope mount that is compact in size and easy to store and transport.

Yet another object of the present invention is to provide a disc based alt-azimuth telescope mount wherein the telescope is mounted to the side and hangs over the side of the mount such that it is capable of aiming through a wide range from below the horizon to overhead.

A further object of the present invention is to provide a disc based alt-azimuth telescope mount wherein rigidity due to the close coupling (short arms) is inherent to the design.

Another object of the present invention is to provide a disc based alt-azimuth telescope mount designed for use with both astronomical and terrestrial telescopes and lenses.

An additional object of the present invention is to provide a disc based alt-azimuth telescope mount that does not require locks during the use of slow motion controls.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which:

FIG. 7 is a front, perspective view of the disc based alt-azimuth telescope mount of the present invention, with the mount housing removed from the mount, more particularly illustrating rotation of an azimuth axis rotating disc to facilitate adjustment of a telescope along an azimuth axis and rotation of an altitude axis rotating disc to facilitate adjustment of the telescope along an altitude axis;

FIG. 8 is a side view of the disc-based alt-azimuth telescope mount, with the side support plate of the mount housing removed to illustrate an altitude axis fixed disc of the mount;

FIG. 9 is a cross-section taken along section lines 9-9 in FIG. 8, illustrating a ball bearing mechanism for each friction adjusting nut, which allows the adjusting mechanism to turn freely with the shaft and having no contact with the disc wall;

DETAILED DESCRIPTION OF THE PREFERRED EMBODIMENTS

Shown throughout the figures, the present invention is generally directed towards a disc based alt-azimuth telescope mount for use with any of a variety of existing telescopes.

Figure 10:
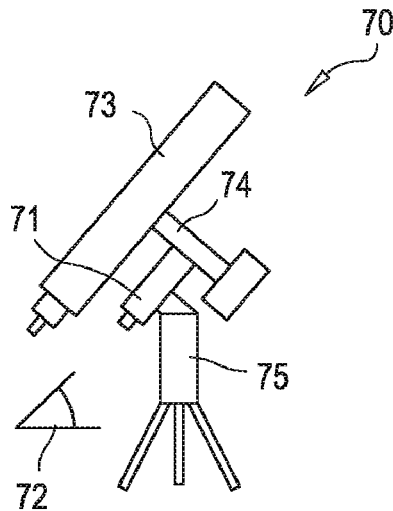
FIG. 10 is a side view of a prior art equatorial telescope mount.

Referring initially to FIG. 10, a prior art equatorial telescope mount 70, provided on a tripod 75, is shown. As shown in the Figure, the telescope mount 70 of the prior art includes a lower or right ascension axis 71 disposed at an angle to the observer's latitude 72 and pointed north (northern hemisphere) or south (southern hemisphere). This places the telescope 73 at the same plane as the earth, which allows the telescope 73 to follow a curve equal to the celestial curve at the observer's location, making it possible for the telescope 73 to track celestial objects as the earth spins with a single movement of the right ascension axis 71 (east-west movement) while the declination axis 74 (north-south movement) remains stationary while the object is being observed.

Figure 11:
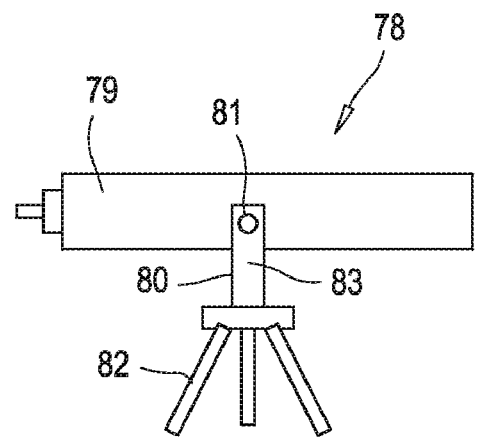
FIG. 11 is a side view of a prior art alt-azimuth telescope mount.
Figure 12:
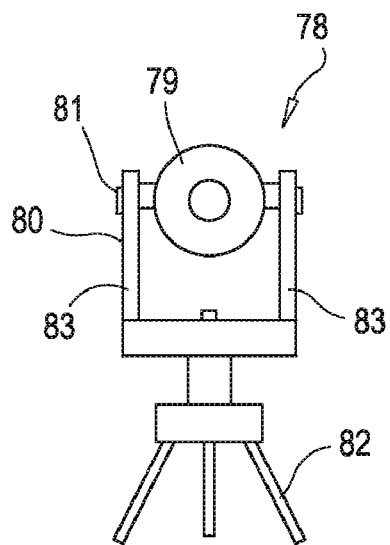
FIG. 12 is a front view of a prior art two arm alt-azimuth telescope mount.

A prior art altitude-azimuth (also called alt-azimuth or azimuth) telescope mount 78 is shown in FIGS. 11 and 12. This type of telescope mount typically must be adjusted in two distinct movements. A horizontal movement relative to the observer's position (azimuth) is accomplished by adjusting the telescope 79 along an azimuth axis 80. Vertical adjustment (altitude) of the telescope 79 is accomplished by adjusting the telescope 79 along an altitude axis 81. It will be appreciated by those skilled in the art that the alt-azimuth telescope mount 78 must be moved along both axes 80, 81 to track the celestial sphere. Typical prior art alt-azimuth telescope mounts 78 can be mounted on a standard camera tripod 82. Such telescope mounts are either constructed with one or two arms 83 with each arm 83 mounted at a right angle to the azimuth axis 80. Alt-azimuth telescope mounts 78 utilize straight vertical and horizontal movements for adjustment, rather than following a curve, such as is required on equatorial-type mounts.

Figure 13:
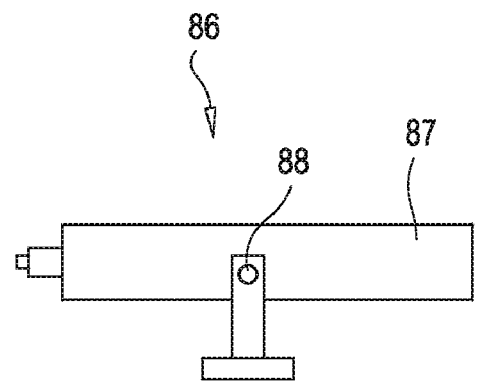
FIG. 13 is a side view showing the center of gravity on a typical prior art telescope mount.

FIG. 13 shows a center of gravity on a typical prior art telescope mount 86. As shown, the telescope 87 is balanced in a saddle near the center of gravity 88 generally at the center of the altitude axis of the telescope mount 86.

Referring to FIGS. 1-8, the disc based alt-azimuth telescope mount, hereinafter referred to as the telescope mount, of the present invention is generally indicated by reference numeral 1. The telescope mount 1 can be used with any of a wide variety of known support structures such as, for example, a standard or conventional telescope tripod 2. The tripod 2 typically includes multiple tripod legs 3 which extend downwardly from a mount base 4.

Figure 1:
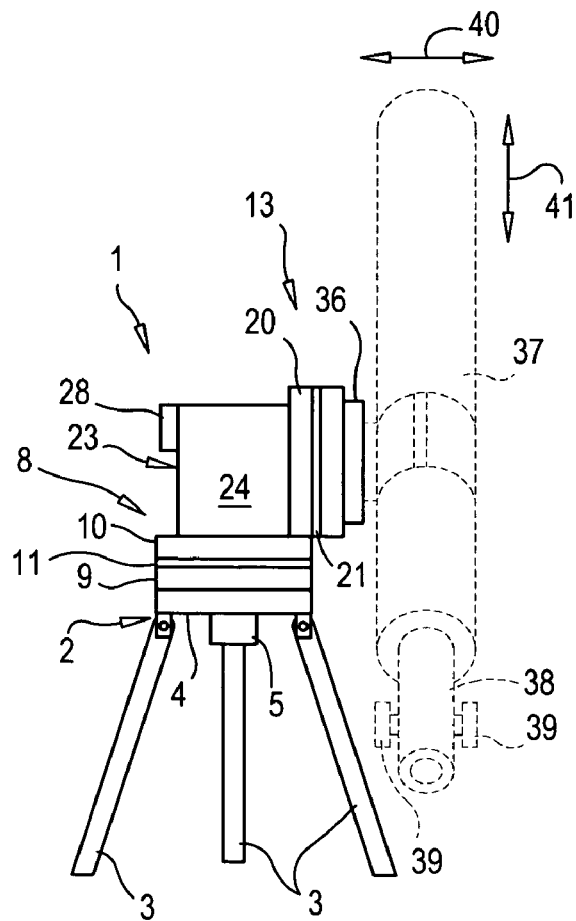
FIG. 1 is a front view of the disc based alt-azimuth telescope mount shown with a telescope in place in accordance with a preferred embodiment of the present invention.
Figure 2:
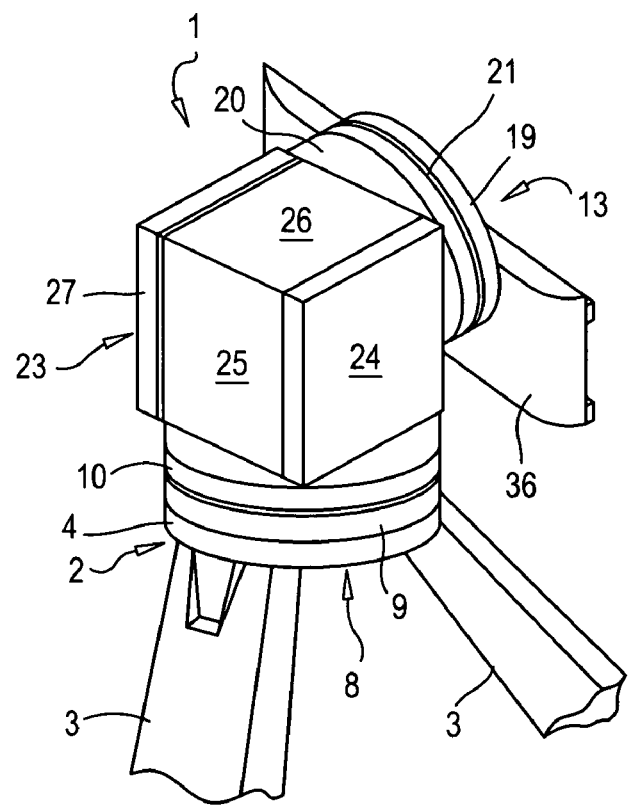
FIG. 2 is a rear, perspective view of the telescope mount provided on a telescope tripod.

Briefly, and as hereinafter further described, the telescope mount 1 includes an azimuth disc assembly 8, which is mounted on the tripod 2; a mount housing 23, which is mounted on the azimuth disc assembly 8; and an altitude disc assembly 13, which is mounted on the mount housing 23. As illustrated in FIGS. 1 and 2, a telescope mount bracket 36 is mounted on the altitude disc assembly 13. A conventional telescope 37 is typically removably mounted on the telescope bracket 36. Accordingly, as illustrated in FIG. 1, the azimuth disc assembly 8 is used to adjust the telescope 37 along an azimuth axis 40 (i.e., right or left), whereas the altitude disc assembly 13 is used to adjust the telescope 37 along an altitude axis 41 (i.e., up or down), in order to properly position the telescope 37 for sighting a celestial or non-celestial object. Likewise, once the object has been sighted, the azimuth disc assembly 8 and the altitude disc assembly 13 are used to prevent inadvertent movement of the telescope 37 along the azimuth axis 40 and the altitude axis 41, respectively.

Figure 5:
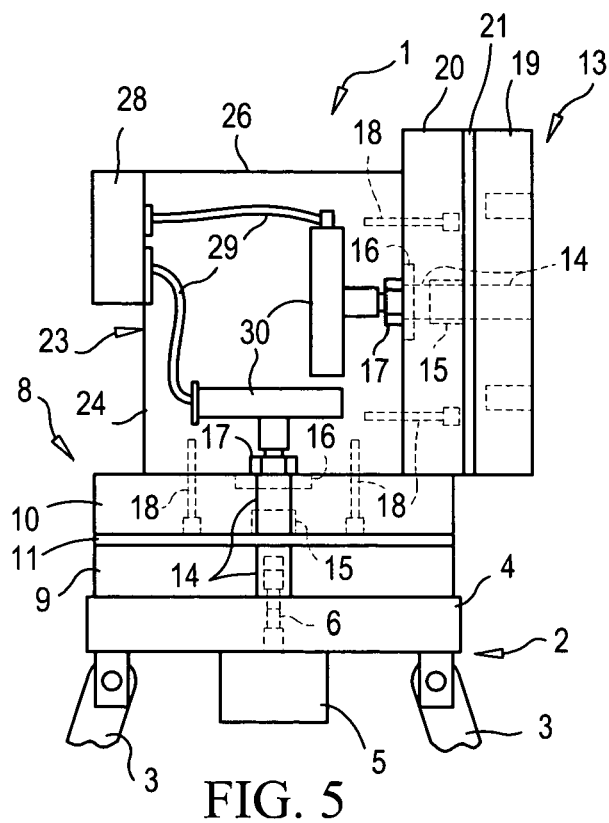
FIG. 5 is a front cross-sectional view of the disc-based alt-azimuth telescope mount showing optional electronic shaft encoders and digital setting circles in accordance with a preferred embodiment of the present invention, with the front support plate of the mount housing removed for clarity.

As shown in FIG. 5, the azimuth disc assembly 8 includes an azimuth axis rotating disc 10 which is mounted on a shaft 14, typically through a mechanical press-fit. A mount-securing knob 5, from which extends a mount screw 6, threadibly engages the shaft 14 to further secure the telescope mount 1 to the tripod 2. Accordingly, the azimuth axis rotating disc 10 is capable of rotating on the shaft 14, as hereinafter further described. An azimuth axis fixed disc 9 is further mounted on the shaft 14, typically on a shaft bearing 15, such that the shaft 14 passes freely through the bearing 15 and through a central opening (not shown) in the azimuth axis fixed disc 9. A friction disc spacer 11, which may be plastic, is interposed between the azimuth axis rotating disc 10 and the azimuth axis fixed disc 9. Accordingly, while the azimuth axis rotating disc 10 will turn on the shaft 14, the azimuth axis fixed disc 9 will turn with the rotating disc 10 only if there is enough friction between the two. A friction adjusting nut 17 threadibly engages the shaft 14 and impinges against an adjusting nut bearing 16 recessed in the upper face of the rotating disc 10. By threading the friction adjusting nut 17 against the adjusting nut bearing 16, the discs 9, 10 can be squeezed together against the friction disc spacer 11 to vary the amount of friction between the discs 9, 10. It will be appreciated by those skilled in the art that the amount of friction can also vary depending upon the diameter of the discs 9, 10 and spacer 11 of the azimuth disc assembly, as well as the type of material used for the friction disc spacer 11.

As illustrated in FIGS. 1, 2, and 5, the telescope mount 1 typically further includes the mount housing 23. The mount housing 23 includes a front support plate 24 and a rear support plate 27, each of which extends upwardly from the upper surface of the azimuth axis rotating disc 10. As illustrated in FIG. 5, disc mount bolts 18 may be used to mount the front support plate 24 and the rear support plate 27 to the azimuth axis rotating disc 10.

Figure 14:
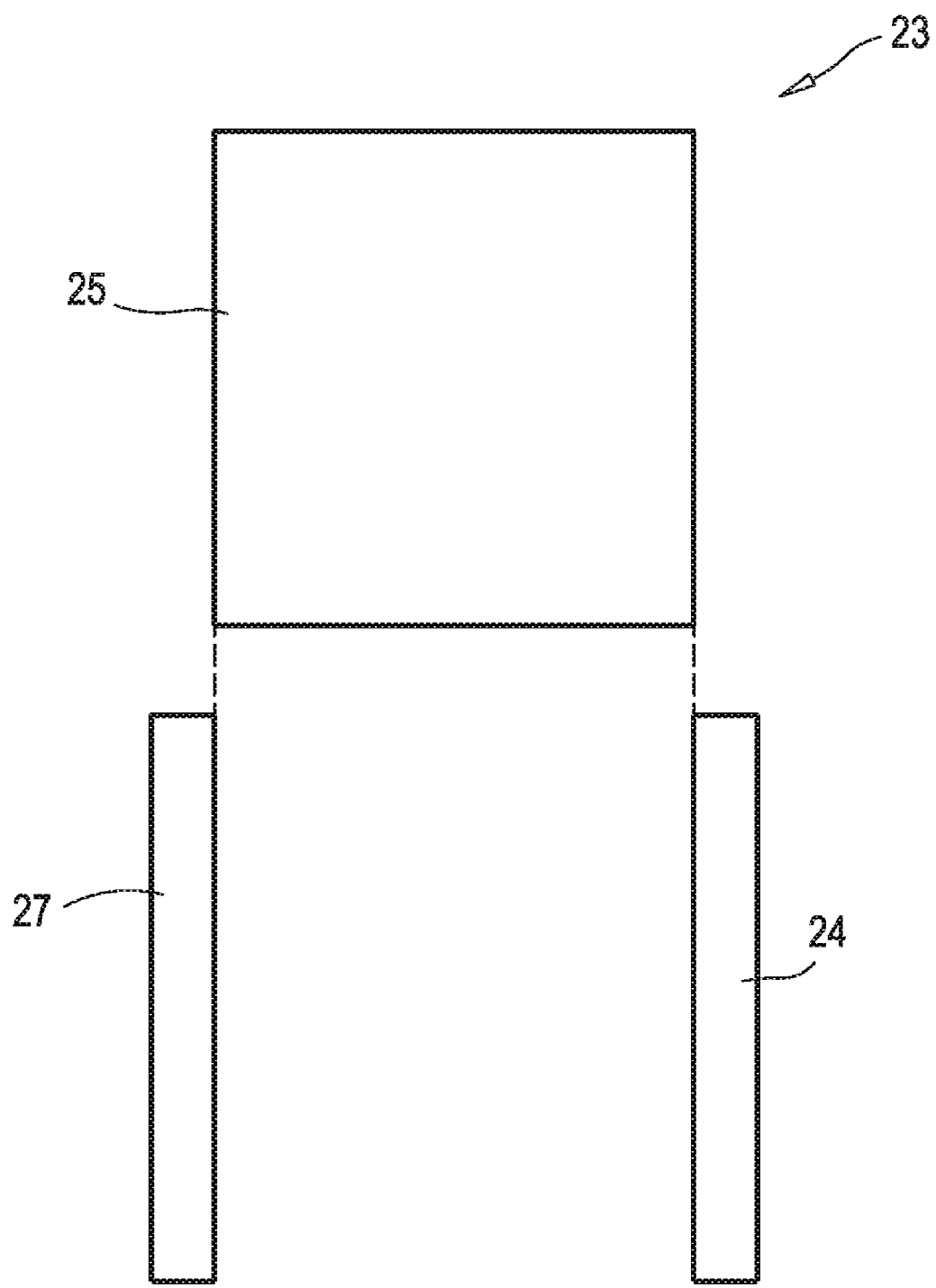
FIG. 14 is an exploded view illustrating slidable engagement of a side support plate with a front support plate and a rear support plate of the mount housing.

A side support plate 25 typically slidably and removably engages the front support plate 24 and the rear support plate 27, as illustrated in FIG. 14. A top support plate 26 typically removably engages the front support plate 24 and the rear support plate 27. Accordingly, the side support plate 25 may be provided with flanges (not shown) which slidably interlock with companion grooves (not shown) provided in the front support plate 24 and the rear support plate 27. Likewise, the top support plate 26 may be provided with flanges (not shown) which slidably interlock with companion grooves (not shown) provided in the front support plate 24 and the rear support plate 27. Alternatively, screws (not shown) can be utilized and put on with screws instead of being slid on.

As further illustrated in FIG. 5, the altitude disc assembly 13 includes an altitude axis fixed disc 20 which is mounted to the front support plate 24 and the rear support plate 27, typically using disc mount bolts 18. A shaft 14 extends freely through an adjusting nut bearing 16, which is recessed in the altitude axis fixed disc 20, and a shaft bearing 15, which is provided in the center of the altitude axis fixed disc 20. An altitude axis rotating disc 19 is mounted on the shaft 14, typically through a mechanical press-fit. Accordingly, the altitude axis rotating disc 19 rotates with the shaft 14, whereas the shaft 14 rotates freely with respect to the altitude axis fixed disc 20. A friction disc spacer 21, which may be plastic, for example, typically has the same diameter as that of the discs 19, 20 and is interposed between the discs 19, 20. A friction adjusting mechanism 17, such as a nut or knob, for example, threadibly engages the shaft 14 and can be rotated against the adjusting nut bearing 16 to press the discs 19, 20 against the friction disc spacer 21 and increase the friction between the discs 19, 20, as hereinafter described.

As illustrated in FIG. 9, the adjusting nut bearing 16 of the altitude axis fixed disc 20 preferably includes an annular ball bearing cavity 32 having multiple ball bearings 33. Accordingly, it will be appreciated that the adjusting nut bearing 16 allows the friction adjusting nut 17 to turn freely with shaft 14 so that the friction adjusting nut 17 does not inadvertently loosen during adjustment. In a most preferred embodiment, the azimuth axis rotating disc 10 will be similarly configured. In order to vary the amount of frictional support, the friction adjusting nut 17 can be loosened or tightened as desired using a standard tool, such as a wrench, as described in more detail below.

As illustrated in FIG. 8, a wrench access space 31 is typically defined between the azimuth axis rotating disc 10 and the altitude axis fixed disc 20. Accordingly, a tool, such as a wrench (not shown), can be inserted through the wrench access space 31 to loosen or tighten the friction adjusting nut 17 on the azimuth disc assembly 8. Furthermore, side support plate 25, the top support plate 26, or both the side support plate 25 and the top support plate 26 can be removed from the mount housing 23, as illustrated in FIG. 8, to provide access to the friction adjusting nut 17 of the azimuth disc assembly 8 and/or the altitude disc assembly 13.

Figure 4:
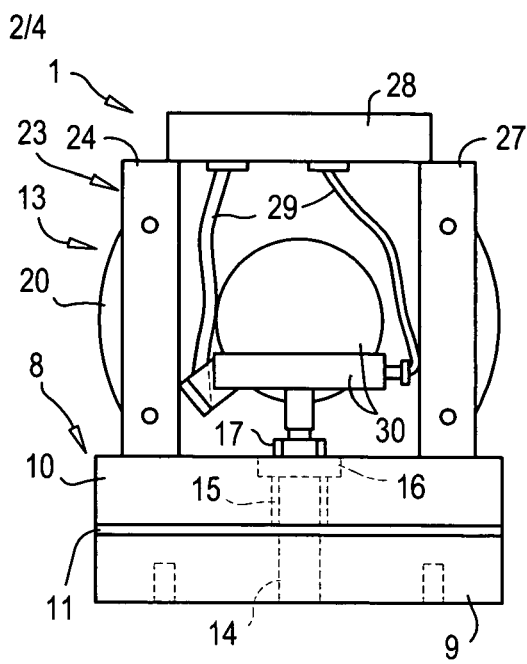
FIG. 4 is a top, partial cross-sectional view of the disc based alt-azimuth telescope mount in accordance with a preferred embodiment of the present invention showing optional electronic shaft encoders and digital setting circles, with a top support plate of the mount housing removed from the mount.

As illustrated in FIGS. 4 and 5, optional digital setting circles 28, which may be conventional, can be provided on the mount housing 23, in which case electronic shaft encoders 30 are provided on the shaft 14 of the azimuth disc assembly 8, as well as the shaft 14 of the altitude disc assembly 13. Cables 29 connect the digital setting circles 28 to the respective electronic shaft encoders 30. Accordingly, digital setting circles 28 may be used to indicate the position of the azimuth axis rotating disc 10 so that the telescope 37 can be moved along the azimuth axis. Likewise, digital setting circles 28 may be used to indicate the position of the altitude axis rotating disc 19 so that the telescope 37 can be moved along the altitude axis 41, during operation of the telescope mount 1 as hereinafter further described.

Figure 3:
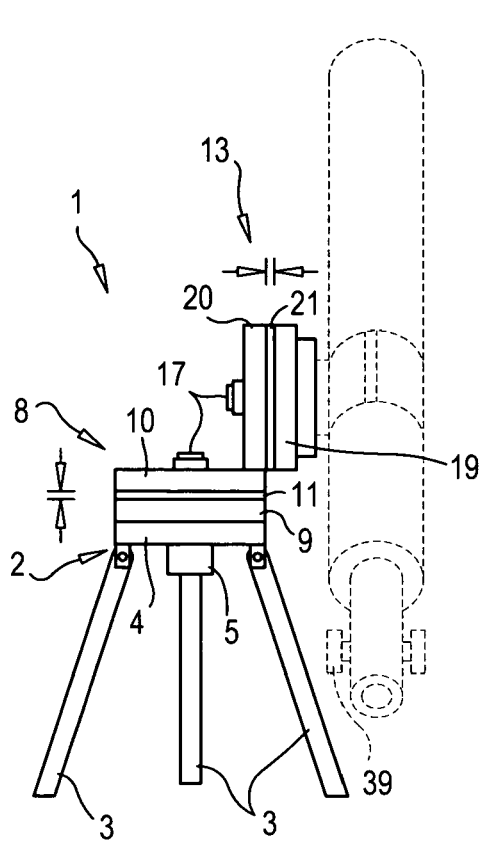
FIG. 3 is a front view of the disc based alt-azimuth telescope mount shown with a telescope in place in accordance with a preferred embodiment of the present invention, with the front, rear, side and top support plates of a mount housing removed from the telescope mount for clarity.

Referring next to FIGS. 1, 3 and 7, in typical operation of the telescope mount 1, a conventional telescope 37, typically having an eyepiece holder 38 and a focusing knob or knobs 39, is attached to the telescope mount bracket 36 (FIG. 2) of the telescope mount 1. The position of the telescope 37 is adjusted along the azimuth axis 40 (i.e., right or left) and along the altitude axis 41 (i.e., up or down), typically in conjunction with the operation of the digital setting circles 28. Accordingly, coordinate information which corresponds to the location of an object to be sighted through the telescope 37 is initially programmed into the digital setting circles 28. Next, using position information obtained from the digital setting circles 28, through the electronic shaft encoders 30, the shaft 14 of the azimuth disc assembly 8 and the shaft 14 of the altitude disc assembly 13 are turned, as desired, to position of the telescope 37 appropriately along both axes.

As illustrated in FIG. 7, the digital setting circles 28 indicate the position of the azimuth axis rotating disc 10 along a rotational axis 10a. Once the position of the azimuth axis rotating disc 10 is known, the mount housing 23, altitude axis disc assembly 13, and attached telescope 37 are positioned along the azimuth axis 40 until the position of the telescope 37 corresponds to the azimuth position of the object to be sighted.

As further illustrated in FIG. 7, the digital setting circles 28 also indicate the position of the altitude axis rotating disc 19 along a rotational axis 19a. Once the position of the altitude axis rotating disc 19 is known, the attached telescope 37 can be adjusted along the altitude axis 41 until the sighting position of the telescope 37 corresponds to the altitude position of the object to be sighted. Accordingly, the telescope 37 is positioned at both the azimuth position and the altitude position programmed into the digital setting circles 28, so that the object can be sighted through the eyepiece (not shown) of the telescope 37.

It will be appreciated by those skilled in the art that the azimuth disc assembly 8 and the altitude disc assembly 13 must be frictionally adjusted so as to prevent inadvertent drifting or movement of the telescope 37 from a sighted position during use. This adjustment is typically only required during the initial setting up of a new telescope on the mount or substantial changes in auxiliary equipment, such as, for example, during changing of a heavy eyepiece for a lighter eyepiece. This is accomplished by using a tool, such as a wrench (not shown), to tighten the friction adjusting nuts 17 against the adjusting nut bearings 16 of the respective azimuth disc assembly 8 and altitude disc assembly 13. Accordingly, as best illustrated in FIGS. 3 and 7, upon tightening of the nut 17 of the azimuth disc assembly 8, the azimuth axis fixed disc 9 and the altitude axis rotating disc 10 are pressed against the intervening friction disc spacer 11. This prevents the azimuth axis rotating disc 10 from rotating with respect to the azimuth axis fixed disc 9 and inadvertently moving the telescope 37 from the sighted position along the azimuth axis 40. Similarly, upon tightening of the nut 17 of the altitude disc assembly 13, the altitude axis fixed disc 20 and the altitude axis rotating disc 19 are pressed against the intervening friction disc spacer 21. This prevents the altitude axis rotating disc 19 from rotating with respect to the altitude axis fixed disc 20 and inadvertently moving the telescope 37 from the sighted position along the altitude axis 41. It should be noted that the frictional adjustment described need only be performed at the initial set up of the telescope mount 1 and will generally not be required again unless substantial changes in weight distribution are initiated, such as, for example, during the changing of a lighter eyepiece for a much heavier one or the replacement of one telescope for another of substantially differing weight. Frictional adjustment is not anticipated, however, for typical eyepiece changes, and it is seen that the telescope mount 1 is always in a sight-ready mode and available for immediate use as desired.

After a period of time has elapsed since initial sighting of the celestial object through the telescope 37, it frequently becomes necessary to re-adjust the position of the telescope 37 along the azimuth axis 40 to compensate for the rotation of the earth. Accordingly, it is seen that the telescope can be manually moved by the observer by overcoming the friction between the disc 19 and the friction disc spacer 21 by applying sufficient force to permit the telescope 37 to move freely. Upon coming to rest, however, the friction between the disc 19 and the friction disc spacer 21 will preferably be sufficient to maintain the current position in a secure manner until movement to a new position is desired.

In the present invention, the disc based alt-azimuth telescope mount 1 is configured with the altitude axis disc assembly 13 mounted to the side of the azimuth axis disc assembly 9. The telescope 37 can be mounted in the center of gravity of the altitude axis 41. As such, no counter balance will be required and the telescope 37 will not hit the azimuth axis 40. Because no counter balance is needed, the shafts 14 can be kept short and smaller in diameter. This will allow the shafts 14 to terminate on the same plane. The electronic shaft encoders 30 may be mounted directly to the ends of the shafts 14. This is a major advantage because battery-powered digital setting circles 28 may be mounted without external cables 29 passing through the shafts 14 or wrapping around the mount 1 as it is turned on its axis.

In a most preferred embodiment, the disc based telescope mount will include a shaft threaded on one end such that a nut can be used to allow the disc to be pulled together. This permits the tension or friction between the disc to be easily adjustable. In the disc based telescope mount of the present invention, a ball bearing assembly will be added between the nut and the disc. This permits the nut to turn freely with the shaft and still be easily adjustable.

Figure 6:
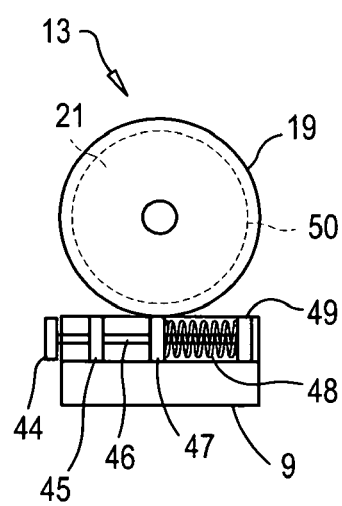
FIG. 6 is a partial front view of the disc based alt-azimuth telescope mount utilized with a typical slow motion control mechanism in accordance with a preferred embodiment of the present invention.

As shown in FIG. 6, the plastic friction disc spacer 21 may be formed with a tab 50 added to it so that the tab 50 protrudes past the altitude axis rotating disc 19. Further, a slow motion threaded rod or screw 46 with a knob 44 (or alternatively, a motor) and slow motion threaded block 45 can be secured to the altitude axis rotating disc 19 in such a manner to allow the screw 46 to push on the tab 50. A spring 48 and spring block assembly 49 pushing in the opposite direction will keep tension on the tab 50. As the knob 44 is turned, disc 19 will move with friction disc spacer 21, which in turn will move the telescope 37 along the altitude axis 41. Since friction will always exist between the disc, no locks will be needed. If however, the telescope (axis) is manually moved by the observer, the friction between the disc 19 and the friction disc spacer 21 will be overcome and the telescope 37 will move freely. A similar slow motion control mechanism can be added to the azimuth disc assembly 8 to provide slow motion control of the telescope 37 along the azimuth axis 40, as well.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

I claim:

1. A telescope mount for mounting and adjusting a telescope along altitude and azimuth axes, comprising:
an azimuth disc assembly for adjusting the telescope along the azimuth axis;
a first friction adjusting mechanism operably engaging said azimuth disc assembly for applying friction against said azimuth disc assembly;
a mount housing carried by said azimuth disc assembly and having a front support plate and a rear support plate extending from said azimuth disc assembly in parallel and spaced-apart relationship with respect to each other and a side support plate extending between and slidably engaging said front support plate and said rear support plate and disposed in perpendicular relationship with respect to each of said front support plate and said rear support plate;
an altitude disc assembly carried by said mount housing for adjusting the telescope along the altitude axis; and
a second friction adjusting mechanism operably engaging said altitude disc assembly for applying friction against said altitude disc assembly.

2. The telescope mount of claim 1 wherein said first friction adjusting mechanism comprises an azimuth axis fixed disc and an azimuth axis rotating disc rotatably carried by said azimuth axis fixed disc.

3. The telescope mount of claim 1 wherein said mount housing further comprises a top support plate carried by said front support plate and said rear support plate.

4. The telescope mount of claim 3 wherein said azimuth disc assembly comprises an azimuth axis fixed disc and an azimuth axis rotating disc rotatably carried by said azimuth axis fixed disc.

5. The telescope mount of claim 1 wherein said altitude disc assembly comprises an altitude axis fixed disc and an altitude axis rotating disc rotatably carried by said altitude axis fixed disc.

6. The telescope mount of claim 5 wherein said azimuth disc assembly comprises an azimuth axis fixed disc and an azimuth axis rotating disc rotatably carried by said azimuth axis fixed disc.

7. The telescope mount of claim 5 wherein said first friction adjusting mechanism and said second friction adjusting mechanism each comprises a friction adjusting nut.

8. The telescope mount of claim 7 wherein said mount housing further comprises a top support plate carried by said front support plate and said rear support plate.

9. A telescope mount for mounting and adjusting a telescope along altitude and azimuth axes, comprising:
   an azimuth disc assembly for adjusting the telescope along the azimuth axis;
   a first friction adjusting mechanism operably engaging said azimuth disc assembly for applying friction against said azimuth disc assembly;
   a mount housing carried by said azimuth disc assembly and having a rectangular front support plate and a rectangular rear support plate extending from said azimuth disc assembly in parallel and spaced-apart relationship with respect to each other and a rectangular side support plate extending between and slidably engaging said front support plate and said rear support plate and disposed in perpendicular relationship with respect to each of said front support plate and said rear support plate and a rectangular top support plate carried by said front support plate and said rear support plate;
   wherein said mount housing has a cubical shape;
   an altitude disc assembly carried by said mount housing for adjusting the telescope along the altitude axis;
   a second friction adjusting mechanism operably engaging said altitude disc assembly for applying friction against said altitude disc assembly; and
   a digital setting circle operably connected to said azimuth disc assembly and said altitude disc assembly for automatically adjusting the telescope along the altitude and azimuth axes.

10. The telescope mount of claim 9 wherein said azimuth disc assembly comprises an azimuth axis fixed disc and an azimuth axis rotating disc rotatably carried by said azimuth axis fixed disc.

11. The telescope mount of claim 9 wherein said altitude disc assembly comprises an altitude axis fixed disc and an altitude axis rotating disc rotatably carried by said altitude axis fixed disc.

12. The telescope mount of claim 9 wherein said top support plate is disposed in perpendicular relationship with respect to each of said front support plate, said rear support plate and said side support plate.

13. The telescope mount of claim 12 wherein said top support plate slidably engages said front support plate and said rear support plate.

14. The telescope mount of claim 13 wherein said azimuth disc assembly comprises an azimuth axis fixed disc and an azimuth axis rotating disc rotatably carried by said azimuth axis fixed disc.

15. The telescope mount of claim 13 wherein said altitude disc assembly comprises an altitude axis fixed disc and an altitude axis rotating disc rotatably carried by said altitude axis fixed disc.

16. The telescope mount of claim 15 wherein said azimuth disc assembly comprises an azimuth axis fixed disc and an azimuth axis rotating disc rotatably carried by said azimuth axis fixed disc.

* * * * *